United States Patent
Yang et al.

(10) Patent No.: US 11,922,643 B2
(45) Date of Patent: Mar. 5, 2024

(54) VEHICLE SPEED INTELLIGENT MEASUREMENT METHOD BASED ON BINOCULAR STEREO VISION SYSTEM

(71) Applicant: ZHONGYUAN UNIVERSITY OF TECHNOLOGY, Henan (CN)

(72) Inventors: Lei Yang, Zhengzhou (CN); Xiaowei Song, Zhengzhou (CN); Menglong Li, Zhengzhou (CN); Yuan Li, Zhengzhou (CN); Wenjing Cai, Zhengzhou (CN); Jianchen Luo, Zhengzhou (CN)

( * ) Notice: Subject to any disclaimer, the term of this patent is extended or adjusted under 35 U.S.C. 154(b) by 0 days.

(21) Appl. No.: 17/624,508

(22) PCT Filed: Jul. 29, 2020

(86) PCT No.: PCT/CN2020/105454
§ 371 (c)(1),
(2) Date: Jan. 3, 2022

(87) PCT Pub. No.: WO2021/004548
PCT Pub. Date: Jan. 14, 2021

(65) Prior Publication Data
US 2022/0405947 A1    Dec. 22, 2022

(30) Foreign Application Priority Data
Jul. 8, 2019    (CN) .......................... 201910608772.6

(51) Int. Cl.
*G06T 7/285*    (2017.01)
*G06T 7/593*    (2017.01)
(Continued)

(52) U.S. Cl.
CPC .............. *G06T 7/285* (2017.01); *G06T 7/593* (2017.01); *G06T 7/74* (2017.01); *G06T 7/85* (2017.01);
(Continued)

(58) Field of Classification Search
USPC ........................................ 382/105, 154, 159
See application file for complete search history.

(56) References Cited

U.S. PATENT DOCUMENTS 10,304,191 B1 * 5/2019 Mousavian .......... G06V 10/255
11,393,227 B1 * 7/2022 Nishimura ............. G06V 20/58
(Continued)

*Primary Examiner* — Kathleen Y Dulaney
(74) *Attorney, Agent, or Firm* — Novoclaims Patent Services LLC; Mei Lin Wong

(57) ABSTRACT

A method for intelligently measuring vehicle speed based on a binocular stereo vision system includes: training a Single Shot Multibox Detector neural network to obtain a license plate recognition model; calibrating the binocular stereo vision system to acquire parameters of two cameras; detecting the license plates in the captured video frames with the license plate recognition model, locating the license plate position; performing feature point extraction and stereo matching by a feature-based matching algorithm; screening and eliminating the matching point pairs, and reserving the coordinates of the matching point pair closest to the license plate center; performing stereo measurement on the screened matching point pair to get the spatial coordinates of the position; calculating and obtaining the speed of the target vehicle. The present invention is easy to install and adjust, could simultaneously recognize multiple trained features automatically, and better suit the intelligent transportation networks and IoT (Internet of Things).

12 Claims, 9 Drawing Sheets

(51) Int. Cl.
   *G06T 7/73*     (2017.01)
   *G06T 7/80*     (2017.01)
   *G06V 10/75*    (2022.01)
   *G06V 10/82*    (2022.01)
   *G06V 20/40*    (2022.01)
   *G06V 20/54*    (2022.01)
   *G06V 20/62*    (2022.01)
   *G08G 1/04*     (2006.01)
   *H04N 5/77*     (2006.01)
   *H04N 13/239*   (2018.01)

(52) U.S. Cl.
   CPC ............ *G06V 10/751* (2022.01); *G06V 10/82* (2022.01); *G06V 20/41* (2022.01); *G06V 20/54* (2022.01); *G06V 20/625* (2022.01); *G06T 2207/10021* (2013.01); *G06T 2207/20084* (2013.01); *G06T 2207/30236* (2013.01); *G06T 2207/30244* (2013.01); *G06V 2201/08* (2022.01); *G08G 1/04* (2013.01); *H04N 5/77* (2013.01); *H04N 13/239* (2018.05)

(56) References Cited

U.S. PATENT DOCUMENTS

| | | | |
|---|---|---|---|
| 2016/0232410 A1* | 8/2016 | Kelly | G06V 30/224 |
| 2018/0211117 A1* | 7/2018 | Ratti | G06V 10/764 |
| 2020/0090366 A1* | 3/2020 | Korjus | G01C 21/3602 |
| 2022/0044558 A1* | 2/2022 | Li | G08G 1/0145 |
| 2022/0092797 A1* | 3/2022 | Song | G08G 1/0175 |

* cited by examiner (a)          (b)

(a)          (b)

(a)              (b)

(a1)        (a2)        (a3)

(b1)        (b2)        (b3)

(a)

(b)

VEHICLE SPEED INTELLIGENT MEASUREMENT METHOD BASED ON BINOCULAR STEREO VISION SYSTEM

CROSS REFERENCE OF RELATED APPLICATION

This application claims the benefit under 35 U.S.C. § 119 from International Application No. PCT/CN 2020/105454, which claims priorities to CN 201910608772.6, filed Jul. 8, 2019.

BACKGROUND OF THE PRESENT INVENTION

Field of Invention

The present invention relates to the technical field of binocular stereo visions, and more particularly to a method for intelligently measuring vehicle speed based on a binocular stereo vision system.

Description of Related Arts

A conventional traffic monitoring system generally takes pictures of a road by means of a photographing device installed above or on one side of the road, and then detects an overspeed behavior and takes a picture as an evidence by means of a pre-embedded coil, a radar, or a laser radar and the like. The conventional traffic monitoring system requires multiple systems to work together to complete the operations of speed measurement, license plate recognition, evidence collection and recording. The installation, placing and adjusting operations are relatively complex. Other illegal driving behaviors, such as answering a phone while driving, not fastening a seatbelt and the like, are generally detected by manually viewing a video or image record. However, the manual traffic offence detection mode obviously cannot satisfy the requirement for traffic monitoring development with more and more vehicles in the future. The construction of intelligent transportation is urgent.

A binocular stereo vision system is a classic vision system in the field of machine visions. The system acquires a pair of video images having a certain parallax with two cameras, and can obtain some states of an object in the real 3D space by calculating the difference between the two images. The common speed measurement methods, such as radar, laser radar and the like, need to destroy the road to bury coils, cannot measure all the vehicle targets in sight, cannot measure the vehicle speed, and cannot complete the vehicle speed measurement on a rough or turning section.

SUMMARY OF THE PRESENT INVENTION

To solve the technical problems that the existing vehicle speed measurement method needs to destroy the road and cannot measure all the vehicle targets in sight, the present invention provides a method for intelligently measuring vehicle speed based on a binocular stereo vision system. The method of the present invention measures the speed by the binocular stereo vision system, has detection secrecy, does not need to destroy the road to bury coils, can simultaneously measure all the vehicle targets in sight, and can measure the vehicle speed on a rough or turning section.

In order to achieve the above-mentioned purpose, the present invention adopts the following technical solution: a method for intelligently measuring vehicle speed based on a binocular stereo vision system, including:

step 1, inputting a dataset of images containing license plates into an SSD neural network, and training the SSD neural network with license plate as the detection feature to obtain a license plate recognition model;

step 2, installing the binocular stereo vision system on the right side, middle or above a lane, calibrating the binocular stereo vision system to acquire the internal and external parameters of two cameras; and recording videos of moving target vehicles by the calibrated binocular stereo vision system;

step 3, detecting the license plates in the video frames recorded by the calibrated binocular stereo vision system with the license plate recognition model trained in step 1, and locating the license plate positions of the target vehicles;

step 4, performing feature point extraction and stereo matching on the license plates in the subsequent frames of the same camera by a feature-based matching algorithm, and reserving correct matching points after filtering with a homography matrix; performing feature point extraction and stereo matching on the license plates in the corresponding left-view and right-view video frames of the binocular stereo vision system by a feature-based matching algorithm, and reserving correct matching points after filtering with a homography matrix;

step 5, screening the reserved matching point pairs in step 4, then eliminating the screened matching points by the distance measurement method of the binocular stereo vision system, and reserving the one closest to the license plate center as the position of the target vehicle in the current frame;

step 6, performing stereo measurement on the screened matching point pair by the binocular stereo vision system to get the spatial position coordinates; calculating the distance that the target vehicle passes in a certain time according to the position information, and obtaining a moving speed of the target vehicle.

The SSD neural network in step 1 is formed on the basis of a classical SSD neural network by removing the convolutional layer conv11_2 and reserving the convolutional layers conv4_3, conv_7, conv8_2, conv9_2 and conv10_2. The feature information in different scales extracted by the respective convolutional layers is fused and input into a classifier. The position of the license plate is predicted by the license plate recognition model according to the feature maps output by the classifier.

The datasets includes the BIT-Vehicle dataset provided by Beijing Institute of Technology, the open license plate database provided by OpenITS research plan sponsored by Guangdong Key Laboratory of Intelligent Transportation Systems (ITS), and 1000 self-shot vehicle license plate images, with a total of 11000 images.

The binocular stereo vision system includes two cameras and a host computer. The two cameras are flea2 industrial cameras, one for the left-view camera and the other for the right-view camera, and both are connected with the host computer.

The calibration method for the binocular stereo vision system in the step 2 includes: calibrating the two cameras with Zhengyou Zhang's calibration method to acquire their respective parameters such as coordinates of optical center, focal length, scale factor and/or lens distortion; after acquiring the parameters of the two cameras, calibrating the binocular stereo vision system with Zhengyou Zhang's calibration method again to acquire the displacement and rotation angle of the right-view camera relative to the left-view camera (taking the left-view camera as the reference).

The 3D measurement principle of the binocular stereo vision system is: taking the left-view camera as the reference, calibrating with Zhengyou Zhang's calibration method to acquire the external parameters (relative translation vector $T1=(l,m,n)^T$ and relative rotation vector $V=(\alpha,\beta,\gamma)^T$) of the right-view camera and the internal parameters (focal length, optical-axis angle, and distortion) of the two cameras themselves, wherein, l,m,n respectively refer to the displacements of the right-view camera relative to the left-view camera in the three directions of x, y and z; $\alpha,\beta,\gamma$ respectively refer to the rotation angles of the right-view camera relative to the left-view camera around the three axes of x, y and z.

The convergence point of the binocular stereo vision system is determined according to the external parameters:

$$\begin{cases} B = \sqrt{l^2 + m^2 + n^2} \\ \varepsilon = \beta \end{cases};$$

wherein, B is a baseline length between the two cameras, and $\varepsilon$ indicates the angle between the optical axes of the two cameras.

The transformation model is established for the target angle. The imaging points of the same space point in the two cameras are respectively called the left corresponding point and the right corresponding point, which are intersections of the left-view camera and the right-view camera's optical axes and their respective imaging planes. a' represents the difference between the left corresponding point and the convergence point in the u direction of the image coordinate system, and b' represents the difference between the right corresponding point and the convergence point in the u direction of the image coordinate system. If the left corresponding point or the right corresponding point is on the left side of the convergence point, the difference value is less than 0, otherwise the difference value is greater than 0.

The optical axes are perpendicular to their respective imaging planes. The line connecting the optical center to the target point is called the corresponding axis. The angles a and b between the corresponding axes and the optical axes can be calculated as:

$$\begin{cases} a = \arctan(a'/f_l) \\ b = \arctan(b'/f_r) \end{cases};$$

wherein $f_l$ and $f_r$ respectively indicate the focal lengths of the left-view camera and the right-view camera.

When the target point is in region I, the target angle c can be calculated as:

$$\begin{cases} c = \varepsilon + |b| - |a| = \varepsilon - b + a \\ a < 0, b < 0 \, \& \, \varepsilon > 0 \end{cases};$$

Assuming the target point P is in the left region and the world coordinates of the point are (x, y, z), a depth calculation model for the target point P can be established as:

$$\tan a = \frac{x}{z};$$

$$\tan(c - a) = \frac{l + x}{z - n}, a < 0$$

then $$z = \frac{n\tan(\varepsilon - b) + l}{\tan(\varepsilon - b) + \tan a};$$

The world coordinate x can be calculated with the depth calculation model for the target point P as:

$$x = \frac{n\tan(\varepsilon - b) + l}{\tan(\varepsilon - b) + \tan a}\tan a.$$

The world coordinate y can be calculated according to the relation between the left corresponding point and the right corresponding point in the image coordinate system and the relation between the image coordinate system and the world coordinate system.

The world coordinates of the target point P are:

$$\begin{cases} x = \frac{n\tan(\varepsilon - b) + l}{\tan(\varepsilon - b) + \tan a}\tan a \\ y = \frac{n\tan(\varepsilon - b) + l}{\tan(\varepsilon - b) + \tan a} \cdot \frac{v'}{f_l} \\ z = \frac{n\tan(\varepsilon - b) + l}{\tan(\varepsilon - b) + \tan a} \end{cases};$$

wherein, v' indicates the pixel difference between the target point and the image center in the longitudinal direction of the image coordinate system. Similarly, the world coordinates of the target point in region II, region III and region IV can be calculated.

The feature-based matching algorithm is a SURF feature extracting and matching algorithm. The local features of the video frames are described by the SURF descriptors. The homography matrix describes the relationship between two images of the same object taken in the different views. Assuming that the relationship of the two images is perspective transformation, then the homography matrix H is:

$$H = \begin{bmatrix} h_{11} & h_{12} & h_{13} \\ h_{21} & h_{22} & h_{23} \\ h_{31} & h_{32} & 1 \end{bmatrix};$$

then $$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix};$$

wherein x' y', 1 and x, y, 1 respectively represent the coordinates of the two matching points before and after the homography matrix transformation, and $h_{11\text{-}32}$ are the transformation parameters to be calculated.

To calculate the eight transformation parameters $h_{11\text{-}32}$ in the homography matrix H, at least four pairs of matching points are needed. The process is as follows:

$$\begin{bmatrix} x_1, y_1, 1, 0, 0, 0, -x'_1x_1, -x'_1y_1 \\ 0,0,0, x_1, y_1, 1, -y'_1x_1, -y'_1y_1 \\ x_2, y_2, 1, 0, 0, 0, -x'_2x_2, -x'_2y_2 \\ 0,0,0, x_2, y_2, 1, -y'_2x_2, -y'_2y_2 \\ x_3, y_3, 1, 0, 0, 0, -x'_3x_3, -x'_3y_3 \\ 0,0,0, x_3, y_3, 1, -y'_3x_3, -y'_3y_3 \\ x_4, y_4, 1, 0, 0, 0, -x'_4x_4, -x'_4y_4 \\ 0,0,0, x_4, y_4, 1, -y'_4x_4, -y'_4y_4 \end{bmatrix} \begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} x'_1 \\ y'_1 \\ x'_2 \\ y'_2 \\ x'_3 \\ y'_3 \\ x'_4 \\ y'_4 \end{bmatrix};$$

Each time, four pairs of matching points are selected from all the matching points to calculate the homography matrix H; then the homography matrix with the maximum number of accurate matching points is selected as the correct result. In order to check the accuracy of the homography matrix H, the Euclidean distance between the corresponding matching points after perspective transformation is calculated:

$$\left\| \begin{bmatrix} x'_{i1} \\ y'_{i1} \\ 1 \end{bmatrix} - H \begin{bmatrix} x_{i1} \\ y_{i1} \\ 1 \end{bmatrix} \right\| \le t;$$

wherein $x'_{i1}, y'_{i1}, 1$ and $x_{i1}, y_{i1}, 1$ respectively represent the coordinates of the matching points before and after the transformation, t is the Euclidean distance threshold, and i1=1,2,3,4. The smaller the Euclidean distance, the higher the matching accuracy of the two matching points.

The screening method in step 5 includes: in the left-view video frame, drawing a circle in a license plate area by taking the center point of the area as the circle center and the height of the area as the diameter; in the corresponding right-view video frame, drawing an isometric circle by taking the center of the matching area as the circle center; and eliminating the matching points not simultaneously contained in the two circles.

The distance measurement method of the binocular stereo vision system in step 5 includes: calculating the distance $d_i$ of all the N matching points respectively; calculating the mean value $\mu$ and the standard deviation $\sigma$ of $d_i$; calculating the Z score $z_i$ for each matching point:

$$\mu = \frac{\sum_{i=1}^{N} d_i}{N}$$

$$\sigma = \sqrt{\frac{1}{N}\sum_{i=1}^{N}(d_i - \mu)^2}$$

$$Z_i = \frac{(d_i - \mu)}{\sigma}$$

eliminating m1 matching points with the absolute values of Z score $|Z_i|>1$; choosing the matching point i closest to the center of the license plate from the remaining N−m1 matching points; and taking its coordinates as the position $P_i$ of the target vehicle in the current frame.

In step 6, stereo measurement is performed on the screened matching points by the binocular stereo vision system to get the positions $P_1=(x_1, y_1, z_1)$ and $P_2=(x_2, y_2, z_2)$ of the target vehicle at the time $t_1$ and $t_2$. The time interval is $\Delta t=t_1-t_2$. The average speed s of the target vehicle between points $P_1$ and $P_2$ can be calculated as:

$$s = \frac{\sqrt{(x_2-x_1)^2 + (y_2-y_1)^2 + (z_2-z_1)^2}}{\Delta t}.$$

The beneficial effects of the present invention: the present invention utilizes the binocular stereo vision system as a vehicle video acquisition device, utilizes the trained SSD neural network to automatically recognize and locate the position of a vehicle, performs tracking and stereo matching on the same target in a binocular stereo video by image matching algorithm, finally utilizes the binocular stereo vision system to detect the spatial position of the vehicle and calculates the vehicle speed. The binocular stereo vision system is easy to install and adjust, can simultaneously and automatically recognize multiple trained features, and can better satisfy the development requirement for the intelligent transportation network and the Internet of Things in the future.

BRIEF DESCRIPTION OF THE DRAWINGS

In order to describe the technical solutions in the embodiments of the present invention or in the prior art more clearly, the drawings to be used in the description of the embodiments or the prior art will be briefly introduced hereafter. It would be obvious that the drawings described below are only some embodiments of the present invention, and a person skilled in the art could obtain other drawings according to these accompanying drawings without involving an inventive effort.

DETAILED DESCRIPTION OF THE PREFERRED EMBODIMENT

The technical solutions in the embodiments of the present invention will be clearly and completely described hereafter in combination with the drawings in the embodiments of the present invention. It is apparent that the described embodiments are only a part of the embodiments of the present invention, but not the whole. On the basis of the embodiments in the present invention, all the other embodiments obtained by a person skilled in the art without involving an inventive effort are all concluded in the protection scope of the present invention.

Figure 1:
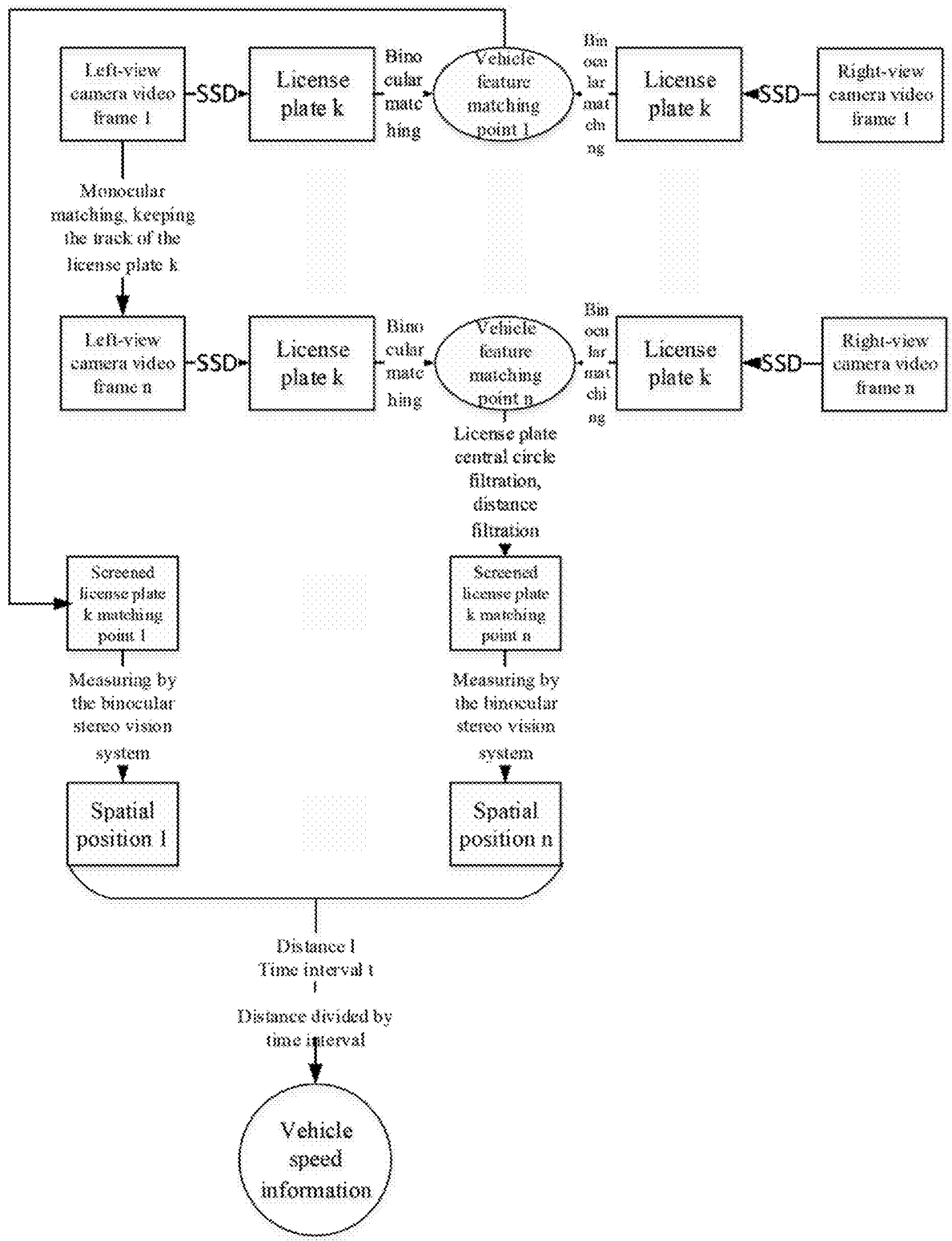
FIG. 1 is a flow chart of the present invention.
Figure 2:
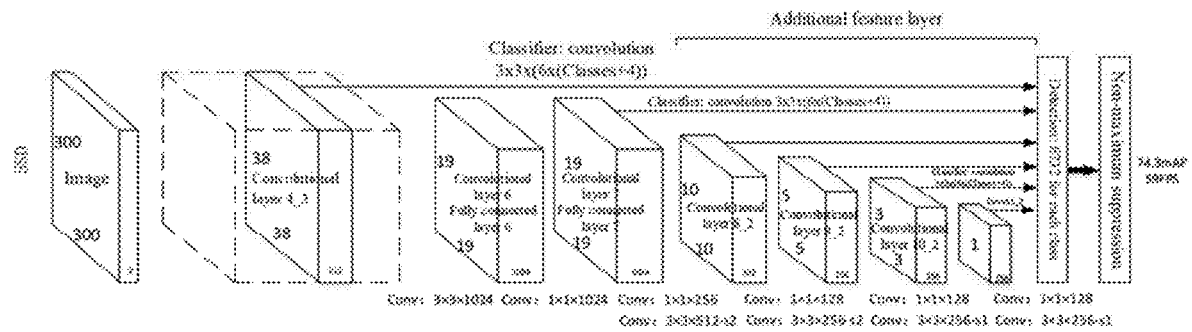
FIG. 2 is a structural diagram of the SSD neural network.

As shown in FIG. 1, a method for intelligently measuring vehicle speed based on a binocular stereo vision system, including the following steps:

Step 1: inputting images containing license plates in an open traffic monitoring video into an SSD neural network, and training the SSD neural network with the license plate as the detection feature to obtain a license plate recognition model.

To detect the moving state of a vehicle in the traffic video recorded by the binocular stereo vision system, first the position of the vehicle should be accurately detected. In order to meet the development requirement of the intelligent transportation network and relieve the pressure caused by the more and more traffic video data, the SSD neural network with high precision and quick detection speed is selected to automatically detect and locate the vehicle target in the video for the particular traffic video monitoring scenario. A license plate recognition model based on SSD neural network is trained to be ready for use. Here, the license plate of the vehicle is chosen as the target to be detected because of its standard style, uniform and relatively small size, rich textures and regular shape, which can improve the accuracy of the position detection and facilitate the acquisition of the matching point position to perform 3D measurement. Different from the conventional image processing-based license plate detection methods, the present invention not only can take the license plate as the detection feature, but also can use other features such as auto logo, wheel, window, backup mirror and the like to further improve the detection accuracy. Moreover, those features can be used to recognize illegal vehicles in the subsequent applications.

According to the statistical distribution of the vehicle size in the road surveillance video, the detection network used in the present invention is improved on the basis of the classic SSD neural network, removing the convolutional layer conv11_2 and reserving the convolutional layers conv4_3, conv_7, conv8_2, conv9_2 and conv10_2. The feature information in different scales extracted by the convolutional layers is fused and input into a classifier. The position of the license plate is predicted according to the feature maps output by the convolutional layers.

The datasets used include the BIT-Vehicle dataset provided by Beijing Institute of Technology, the open license plate database (http://www.openits.cn/) provided by the OpenITS research project sponsored by Guangdong Key Laboratory of Intelligent Transportation Systems, and 1000 license plate images taken by the team of the present invention. The SSD neural network is trained by a total of 11000 images to automatically recognize and locate the license plate in the traffic surveillance video. The license plate recognition model trained by the SSD neural network can accurately recognize the license plate in each frame of the video.

Step 2: installing the binocular stereo vision system on the right side, middle or above a lane, calibrating the binocular stereo vision system to acquire the internal and external parameters of the two cameras, and recording videos of moving target vehicles by the calibrated binocular stereo vision system.

Two flea2 industrial cameras made by POINT GRAY company and a laptop are used to establish the binocular stereo vision system. As a measurement platform, the two cameras synchronously shoot a measurement region, and communicate with the laptop via a USB cable. The laptop is equipped with an Intel Core i7 CPU, a 8G memory, a NVIDIA Geforce 830M discrete graphics card, and a solid state disk. The binocular stereo vision system is installed on the right side, middle or above a lane, so that the two cameras can both shoot the vehicle license plate (either front or back). Afterwards, the two cameras of the binocular stereo vision system are calibrated to acquire the internal and external parameters of the binocular cameras. The present invention calibrates the binocular cameras with Zhengyou Zhang's calibration method to acquire their respective parameters such as coordinates of optical center, focal length, scale factor, lens distortion and the like. After acquiring the internal parameters, the binocular stereo vision system is calibrated with Zhengyou Zhang's calibration method again. In the present experiment, taking the left-view camera as the reference, the displacement and rotation angle of the right-view camera relative to the left-view camera are acquired by calibration.

Figure 3:
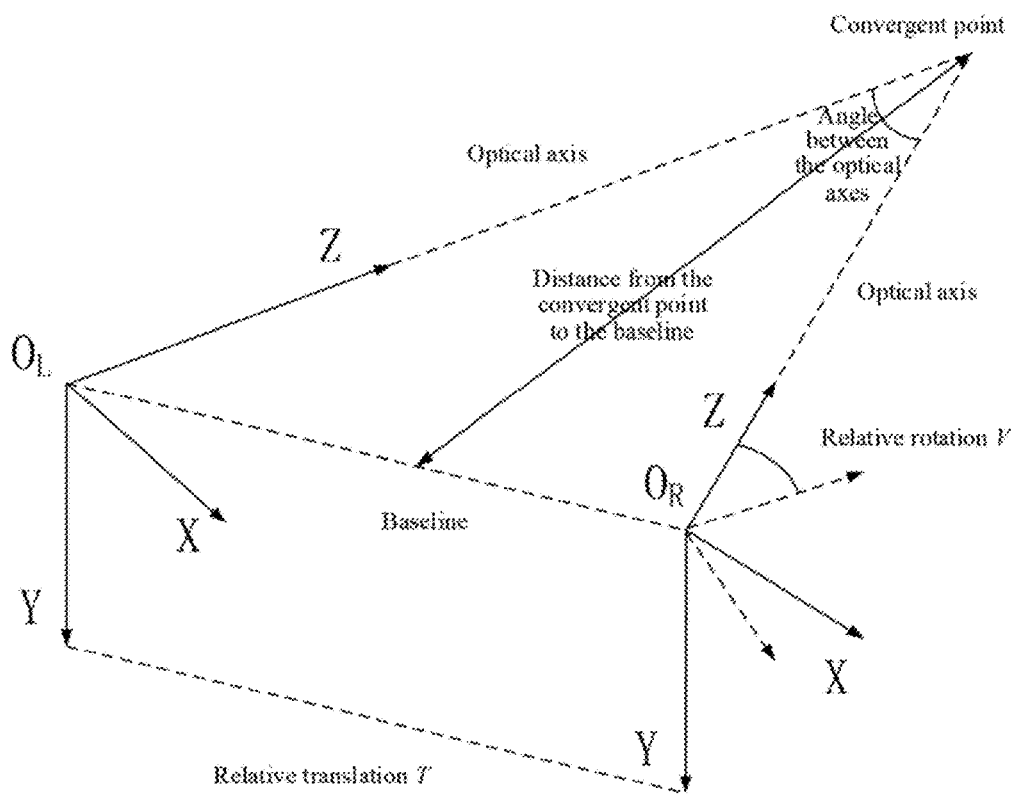
FIG. 3 is a structural schematic view of the convergent binocular stereo vision system.

In practical measurement, each time the camera position is changed, the camera system needs to be calibrated to ensure the measurement accuracy. After acquiring the internal and external parameters of the camera system, the binocular stereo vision system is utilized to measure distance and speed. The calibrated binocular stereo vision system shoots the moving vehicle. The shooting regions of the left-view and right-view cameras are different, and the shooting angles are slightly different. Therefore, the two images have a certain parallax. The images are processed by utilizing the 3D measurement principle of the binocular stereo vision system. In the principle, the left-view camera is taken as the reference. After calibration with Zhengyou Zhang's calibration method, the external parameters (relative translation vector $T1=(l,m,n)^T$ and relative rotation vector $V=(\alpha,\beta,\gamma)^T$) of the right-view camera and the internal parameters (focal length, optical-axis angle and distortion) of the two cameras in the binocular stereo vision system can be acquired, wherein, l,m,n refer to the displacements of the right-view camera relative to the left-view camera in the three directions of x, y and z respectively, $\alpha,\beta,\gamma$ refer to the rotation angles of the right-view camera relative to the left-view camera around the three axes of x, y and z respectively. Then, the baseline length B, namely the space between the two cameras, the angle c between the optical axes of the two cameras, the external parameters of the two cameras, and the convergent point of the binocular stereo vision system can be acquired, as shown in FIG. 3.

The convergence point of the binocular stereo vision system is determined according to the external parameters:

$$\begin{cases} B = \sqrt{l^2 + m^2 + n^2} \\ \varepsilon = \beta \end{cases} \quad (1)$$

Figure 4:
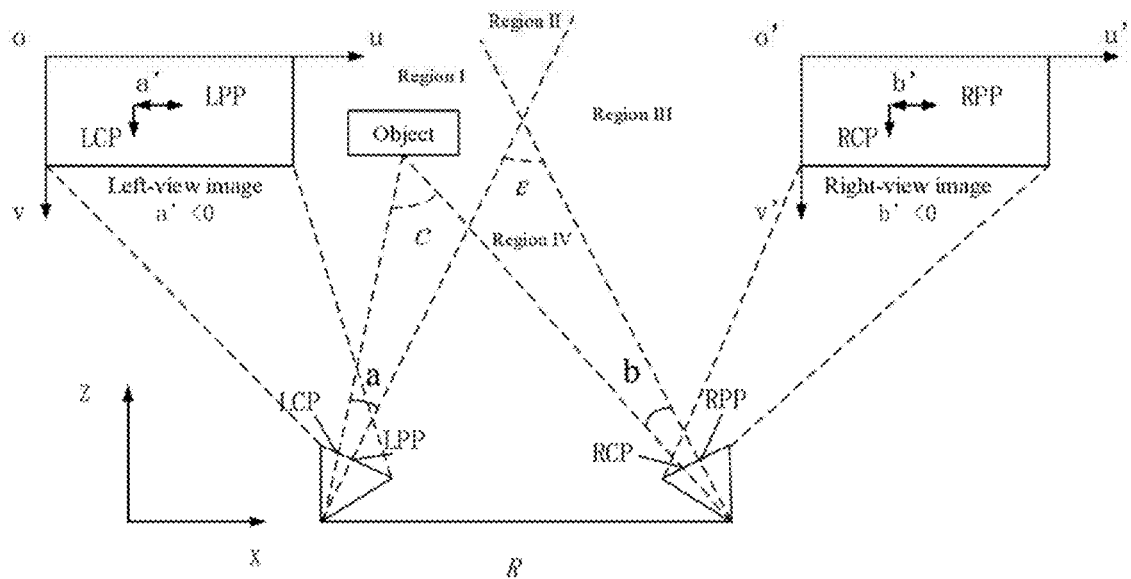
FIG. 4 is a schematic view of the target angle transformation model.

After the baseline length and the transformation angle are acquired, the target angle c and the depth information of the object can be calculated. A target angle transformation model is as shown in FIG. 4. The imaging points of the same space point in the two cameras are respectively called the left corresponding point (LCP) and the right corresponding point (RCP). The LPP and the RPP are respectively intersections of the left-view camera and the right-view camera's optical axes and their respective imaging planes. a' represents the pixel difference between the left corresponding point and the primary point (the convergence point) in the u direction, and b' represents the pixel difference between the right corresponding point and the primary point (the convergence point) in the u direction. If the corresponding point is on the left side of the primary point, the difference is less than 0, otherwise the difference is greater than 0. When the target is located in the region 1, a' and b' are less than 0. The optical axes are perpendicular to their respective imaging planes. The line connecting the optical center to the target point is called the corresponding axis. The angles a and b between the corresponding axes and the optical axes can be calculated as:

$$\begin{cases} a = \arctan(a'/f_l) \\ b = \arctan(b'/f_r) \end{cases} \quad (2)$$

wherein, $f_l$ and $f_r$ indicate the focal lengths of the two cameras respectively. When the target is in region I, the target angle c can be calculated as:

$$\begin{cases} c = \varepsilon + |b| - |a| = \varepsilon - b + a \\ a < 0, b < 0 \ \& \ \varepsilon > 0 \end{cases} \quad (3)$$

Figure 5:
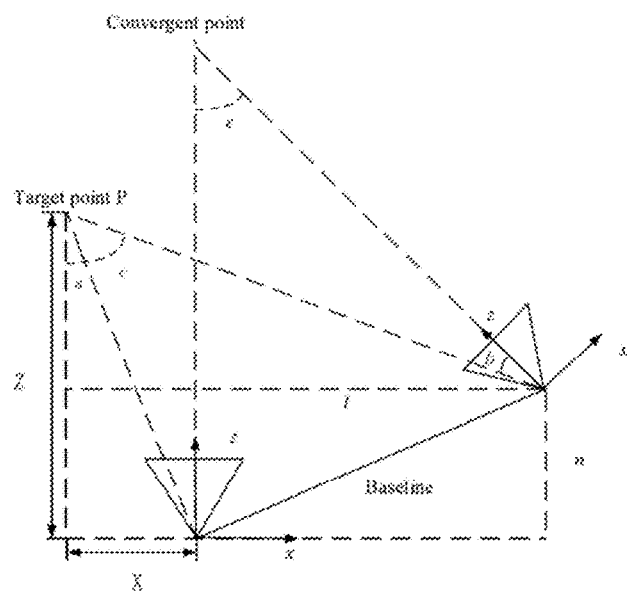
FIG. 5 is a schematic view of the target point depth calculation model.

In the other three regions, the target angles can be deducted similarly. In region II, a'<0, b'>0. In region III, a'>0, b'>0. In region IV, a'>0, b'<0. The depth calculation model of the target point P is shown in FIG. 5. Assuming that the target point P is in region I and the world coordinates of P are (x, y, z), then:

$$\tan a = \frac{x}{z} \quad (4)$$

In FIG. 5, a is a negative value.

$$\tan(c - a) = \frac{l + x}{z - n}, a < 0 \quad (5)$$

then $$z = \frac{n\tan(\varepsilon - b) + l}{\tan(\varepsilon - b) + \tan a} \quad (6)$$

Figure 6:
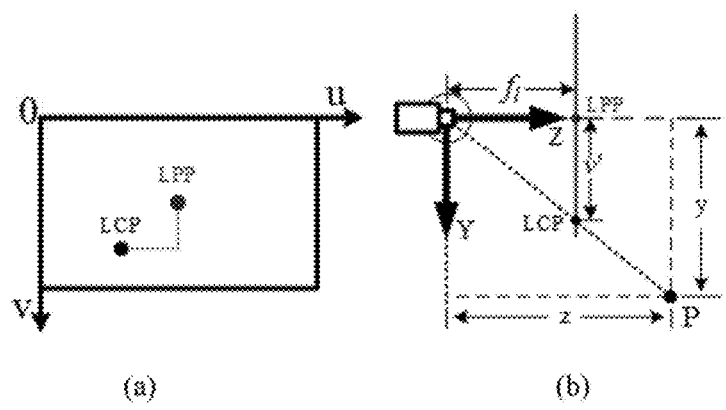
FIG. 6 is a schematic view of the calculation method for value y, wherein (a) indicates the position of the target point relative to the center point on the imaging plane, and (b) indicates the position of the target point relative to the optical axis of the camera in the real space.

The world coordinate x can be calculated as above. The projective point of a target point projected to the left-view camera according to a mapping relationship is called the left corresponding point (LCP); and the left primary point (LPP, i.e. the convergence point) is the intersection point between the optical axis of the left-view camera and a 2D imaging plane. As shown in FIG. 6, in the coordinate system of the left image, the pixel difference between LCP and LPP in the V direction (the longitudinal direction of the image coordinate system) is v', and $f_l$ is the focal length of the left-view camera. Then:

$$\frac{y}{z} = \frac{v'}{f_l}$$

In summary, the world coordinates of the target point P can be calculated as:

$$\begin{cases} x = \frac{n\tan(\varepsilon - b) + l}{\tan(\varepsilon - b) + \tan a} \tan a \\ y = \frac{n\tan(\varepsilon - b) + l}{\tan(\varepsilon - b) + \tan a} \cdot \frac{v'}{f_v} \\ z = \frac{n\tan(\varepsilon - b) + l}{\tan(\varepsilon - b) + \tan a} \end{cases} \quad (7)$$

Similarly, the world coordinates of the target point in region II, region III and region IV can be calculated. Please refer to the patent CN107705331 A, A Vehicle Video Speed Measurement Method based on Multi-View Camera for specific details. The distance from the target point to the camera (i.e. the center of the left-view camera sensor) can be calculated by $D = \sqrt{x^2 + y^2 + z^2}$.

Step 3: detecting license plates in video frames recorded by the calibrated binocular stereo vision system with the license plate recognition model trained in step 1, and locating the license plate positions of the target vehicles.

The license plate is extracted with an SSD neural network algorithm and a target frame with a regular contour is marked, in which a quick processing speed is provided while guaranteeing the detection accuracy; and the requirements for quickly detecting and locating a target in a video can be satisfied. The model trained in step 1 is utilized to perform target detection on the video frame acquired by the camera calibrated in step 2, so as to locate the license plate. Theoretically, it is unnecessary to perform accurate target detection in the measurement region of every frame; the vehicle speed can be detected only by accurately detecting more than two pairs of frames.

Step 4: performing feature point extraction and stereo matching on the license plates in the subsequent frames of the same camera by a feature-based matching algorithm, and reserving correct matching points after filtering with a homography matrix; performing feature point extraction and stereo matching on the license plates in the corresponding left-view and right-view video frames of the binocular stereo vision system by a feature-based matching algorithm, and reserving correct matching points after filtering with a homography matrix;

In order to acquire accurate 3D information in the subsequent binocular video detection, the feature points of the corresponding video images acquired by the left-view and right-view cameras need to be extracted and matched. It should be noted that each target should be correctly tracked if multiple targets exist in the video. Therefore, the same target in each frame of the same video should also be matched, and then 3D information detection is performed on the matching points of corresponding frames in the video recorded by the left-view and right-view cameras at the same time.

The 2D image matching algorithm used in the present invention is a feature based matching algorithm. Feature descriptors are generated according to image features such as point, line (edge), and plane features; then similarity between the descriptors are compared to match between corresponding features of two video images. Plane feature is difficult to extract due to large amount of calculation and time consumption. SURF feature is used in the present invention to perform video image feature extraction and matching. A SURF descriptor describes the local feature of the video image. When the video image is rotated, translated or scale zoomed, the SURF feature extraction and matching algorithm has good stability.

Figure 7:
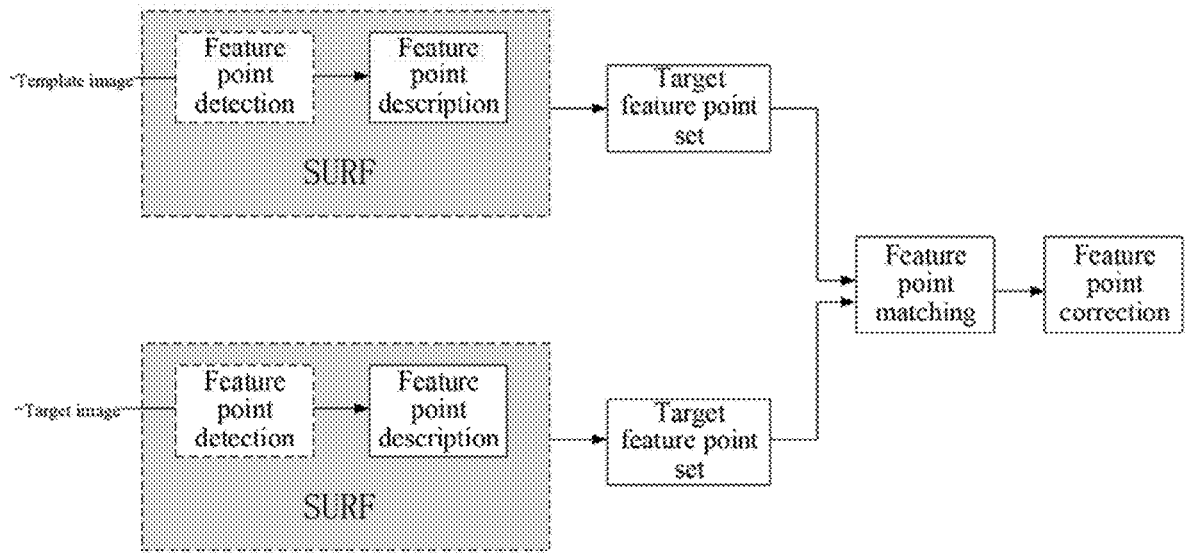
FIG. 7 is a flow chart of the SURF feature extraction and matching algorithm.

As shown in FIG. 7, the SURF feature extraction and matching algorithm mainly includes: 1, extracting key points not influenced by light change, for example, an angle point, an edge point, a bright point in a dark region, and a dark point in a bright region; 2, extracting the detailed local feature vector for these key points; and 3, pairwise comparing the feature vectors of the template image and the target image, and finding the best matching point pairs to achieve the matching between the two images.

Figure 8:
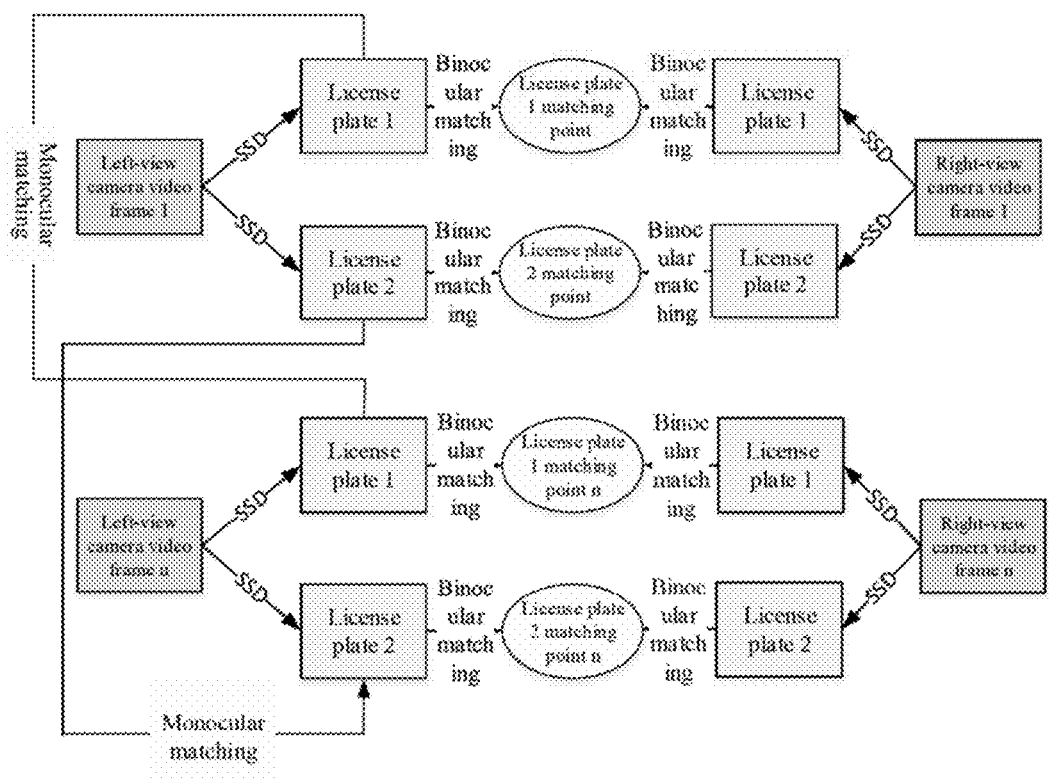
FIG. 8 is a flow chart of monocular video frame feature point matching and binocular stereo matching.

As shown in FIG. 8, the license plates detected in a single view video are matched by the SURF algorithm to independently track the plurality of targets, while the corresponding video frames in the left-view and right-view videos are matched to extract corresponding feature points for stereo measurement. For example, taking the license plate of the white vehicle in FIG. 9(a) as a tracking target, the license plate in the second image is matched by the SURF feature extraction and matching algorithm, so as to accurately locate the position of the same license plate, as shown in the dotted box in FIG. 9(b).

However, the matching results are not 100% accurate whether the feature point extraction algorithm is SIFT, SURF or others. If the image is not clear enough or has a region different from the matching template, mismatching point will be generated. The correctness of vehicle tracking and the result of stereo measurement will be greatly influenced by the mismatching point. Therefore, the mismatching point needs to be eliminated for the matching result.

The homography matrix is utilized to describe the relationship between two images of the same object taken in different views. Assuming that the relationship of the two images is perspective transformation, the homography matrix, namely the perspective transformation matrix H is:

$$H = \begin{bmatrix} h_{11} & h_{12} & h_{13} \\ h_{21} & h_{22} & h_{23} \\ h_{31} & h_{32} & 1 \end{bmatrix} \quad (8)$$

then $$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix} \quad (9)$$

wherein x' y', 1 and x, y, 1 respectively represent the coordinates of the two corresponding points before and after the perspective transformation, and $h_{11\text{-}32}$ are transformation parameters to be calculated.

To calculate the eight transformation parameters $h_{11\text{-}32}$ in the homography matrix H, at least four pairs of matching points are needed. The process is as follows:

$$\begin{bmatrix} x_1, y_1, 1, 0, 0, 0 - x'_1 x_1, x'_1 y_1 \\ 0, 0, 0, x_1, y_1, 1, -y'_1 x_1, y'_1 y_1 \\ x_2, y_2, 1, 0, 0, 0 - x'_2 x_2, x'_2 y_2 \\ 0, 0, 0, x_2, y_2, 1, -y'_2 x_2, y'_2 y_2 \\ x_3, y_3, 1, 0, 0, 0 - x'_3 x_3, x'_3 y_3 \\ 0, 0, 0, x_3, y_3, 1, -y'_3 x_3, y'_3 y_3 \\ x_4, y_4, 1, 0, 0, 0 - x'_4 x_4, x'_4 y_4 \\ 0, 0, 0, x_4, y_4, 1, -y'_4 x_4, y'_4 y_4 \end{bmatrix} \begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} x'_1 \\ y'_1 \\ x'_2 \\ y'_2 \\ x'_3 \\ y'_3 \\ x'_4 \\ y'_4 \end{bmatrix}; \quad (10)$$

Figure 9:
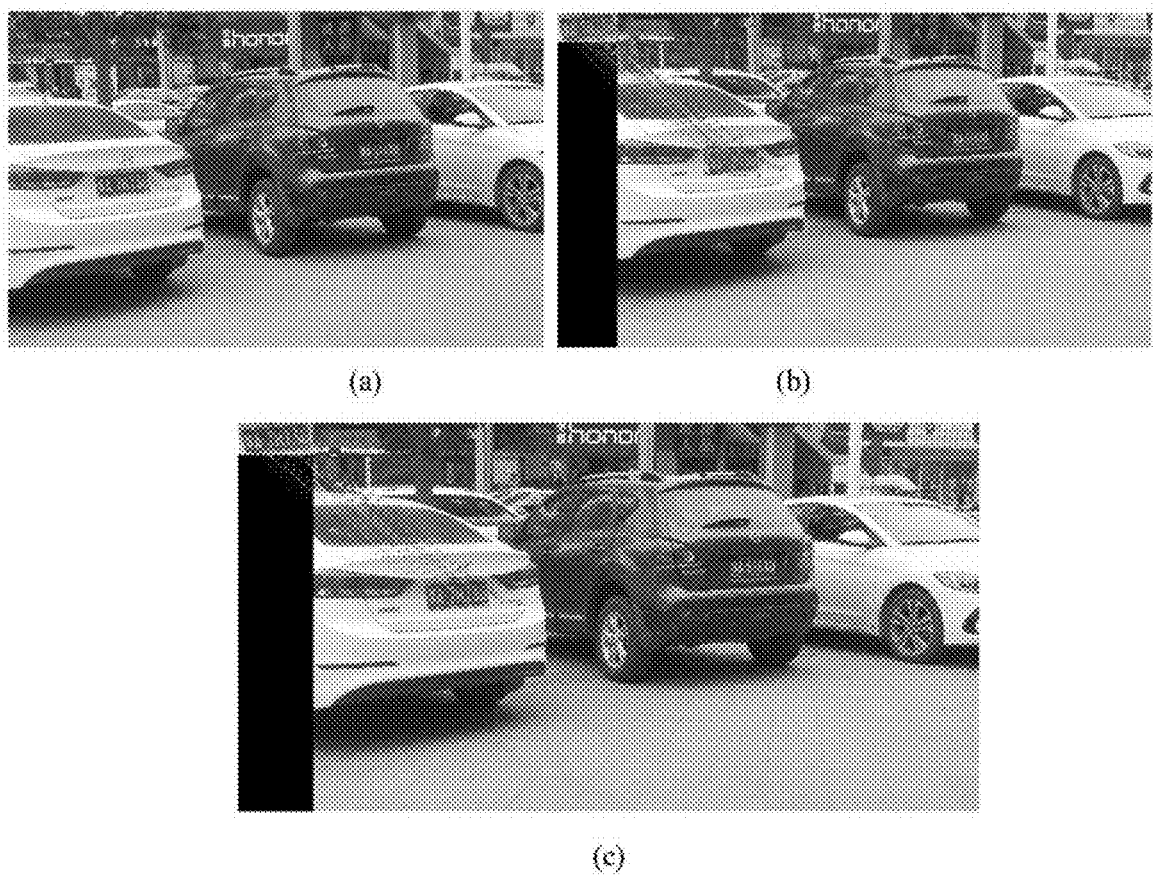
FIG. 9 is a license plate tracking effect diagram in the monocular video, wherein (a) is a previous frame, (b) is a matching result of a white car's license plate between the previous frame and the current frame, and (c) is a matching effect after (b) is filtered with a homography matrix.

Each time, four pairs of matching points are selected from all the matching points to calculate the homography matrix H. Then the homography matrix H with the maximum number of inner points (namely the accurate matching point) is selected as the correct result. In order to check the accuracy of the homography matrix H, the method for calculating the Euclidean distance between the corresponding matching points after the perspective transformation is as follows:

$$\left\| \begin{bmatrix} x'_{i1} \\ y'_{i1} \\ 1 \end{bmatrix} - H \begin{bmatrix} x_{i1} \\ y_{i1} \\ 1 \end{bmatrix} \right\| \leq t \quad (11)$$

wherein, $x'_{i1}$, $y'_{i1}$, 1 and $x_{i1}$, $y_{i1}$, 1 respectively represent the coordinates of the matching points before and after the transformation, t is the Euclidean distance threshold, and i1=1,2,3,4. The smaller the distance, the higher the matching accuracy of the two matching points. As shown in FIG. 9(c), the matching points are extracted with the SURF feature extraction and matching algorithm, and the correct matching points are reserved after being filtered by the homography matrix.

Next, feature point extraction and stereo matching is performed on the license plates in the corresponding video frames of the left-view and right-view cameras with the SURF feature extraction and matching algorithm. The correct results are reserved after being filtered by the homography matrix. Meanwhile, in order to reduce calculation cost, feature point extraction is performed only on the license plate region recognized in step 3. After being further screened, the reserved feature point is treated as the current position of the vehicle to perform stereo measurement.

Step 5: further screening the reserved matching point pairs in step 4, then eliminating the screened matching points with the distance measurement method of the binocular stereo vision system, and reserving the one closest to the license plate center as the position of the target vehicle in the current frame.

Figure 10:
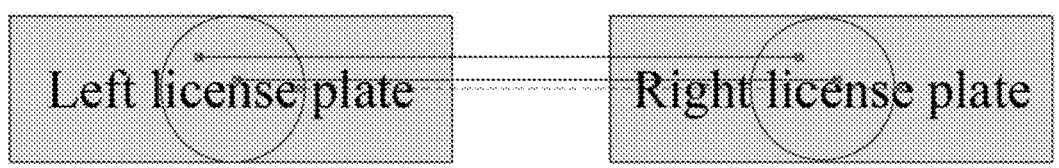
FIG. 10 is a schematic view on how the matching point is further screened.

In order to improve matching accuracy and reduce calculation cost, the reserved matching points are further screened. In the left-view video frame, a circular region is drawn in the license plate area by taking the center point of the area as the circle center and the height of the area as the diameter. In the other corresponding video frame, an isometric circular region is drawn by taking the center point of the matching area as the circle center. The matching points not simultaneously contained in the two circular regions are eliminated. As shown in FIG. 10, the two pairs of matching points connected with solid lines are respectively in the ranges of the circular regions and are correctly matched, and are thus reserved. The matching points connected with dotted lines are in the right license plate but not in the corresponding circular regions, and are thus eliminated. Finally, the matching point connected with the solid line which is closest to the center point of the license plate is selected as the target position for stereo measurement.

After eliminating the feature points not in the target range, an stereo measurement calculation error due to inaccurate matching in the image feature point extraction and matching process is further eliminated. The binocular stereo vision system is utilized to measure distance. The distance $d_i$, the mean value $\mu$ and the standard deviation $\sigma$ of all the N matching positions are respectively calculated, and the Z score $z_i$ for each matching point is calculated:

$$\mu = \frac{\sum_{i=1}^{N} d_i}{N} \tag{12}$$

$$\sigma = \sqrt{\frac{1}{N}\sum_{i=1}^{N}(d_i - \mu)^2} \tag{13}$$

$$Z_j = \frac{(d_i - \mu)}{\sigma} \tag{14}$$

The m1 points (namely the mismatching points) with the absolute value of $z_i$ greater than 1 are eliminated. In the remaining N−m1 points, the point i closest to the center of the license plate is treated as the position Pi of the target vehicle in the current frame.

Step 6: performing stereo measurement on the screened matching points by the binocular stereo vision system to get the spatial position coordinates; calculating the distance that the target vehicle passes in a certain time according to the position information, and obtaining a moving speed of the target vehicle.

Assuming that the positions of the vehicle are $P=(x_1, y_1, z_1)$ and $P_2=(x_2, y_2, z_2)$ at the time $t_1$ and $t_2$. The time interval is $\Delta t=t_1-t_2$. The average speed s of the vehicle between points $P_1$ and $P_2$ can be calculated as:

$$s = \frac{\sqrt{(x_2 - x_1)^2 + (y_2 - y_1)^2 + (z_2 - z_1)^2}}{\Delta t} \tag{15}$$

The distance between two adjacent vehicle positions can be calculated according to the obtained position information. The distance is divided by the time interval between the two measurement points, and the vehicle speed can be measured.

Experiment:

In field experiments, three vehicle moving conditions are designed to verify the effectiveness of the present invention, i.e. straight line motion with a uniform speed, straight line motion with a changing speed, and curved motion. Four groups of experiments are performed: 1, a vehicle travels from far to near along a straight line at a uniform speed; 2, a vehicle travels from far to near along a straight line at an accelerated speed; 3, a vehicle travels from far to near along a curved line at a uniform speed; 4, two vehicles travel from the opposite directions at a uniform speed. The vehicle is driven by referencing the speed meter thereof. At the same time, a speed measurement result of a P-Gear P-510 satellite velocimeter is taken as a ground truth of the vehicle speed for comparison. The velocimeter measures the speed with the data from a GPS+GLONASS double-satellite positioning system, communicates with a mobile phone via a bluetooth 4.0 chip, and ensures the measurement precision by 10 HZ high frequency GPS data exchange. The measurement error thereof is 2%. The real time data is displayed by a mobile phone application, and the speed measured each time and the accelerating curve are recorded.

First Group of Experiment:

Taking the vehicle speed meter as the reference, the vehicle is driven at a uniform speed of 30 km/h. When the vehicle reaches the preset starting line (15 meters away from the shooting position), the binocular stereo vision system is used for shooting until the vehicle leaves the shooting area. The binocular stereo vision system equipment is set up on the right side of the lane, keeping an angle of 20 degrees with the lane. During the shooting period, the vehicle keeps moving in a straight line, and the position and angle of the shooting equipment remain unchanged. The resolution of the captured video is 1288×964, and the frame rate is 30f/s. License plate detection is performed for the two-view videos.

Figure 11:
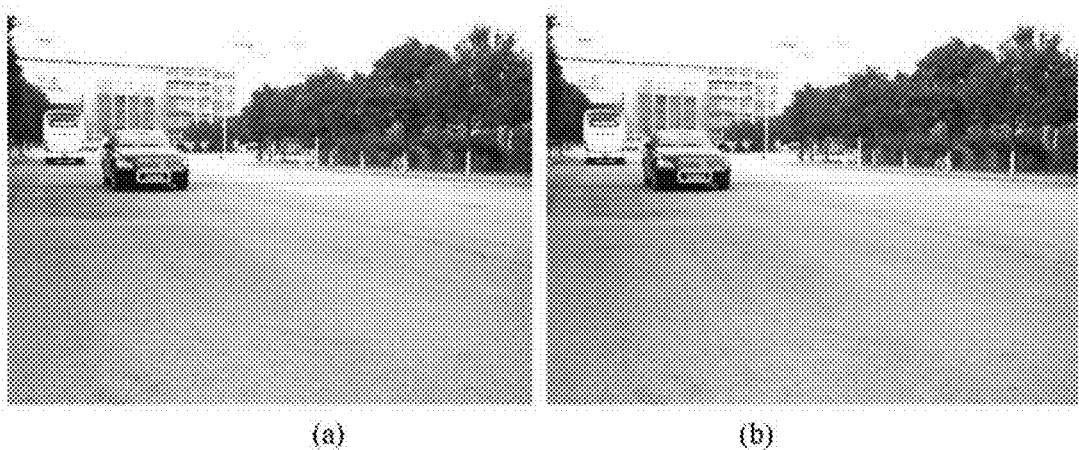
FIG. 11 is an SSD-extracted license plate target of a 3D target vehicle located at 15 m in a first experiment, wherein (a) is a left-view video frame, and (b) is a right-view video frame.
Figure 12:
FIG. 12 is an SSD-extracted license plate target of a 3D target vehicle located at 1 m in the first experiment, wherein (a) is a left-view video frame, and (b) is a right-view video frame.
Figure 13:
FIG. 13 is a schematic view of a license plate area matching between the left-view and right-view video frames in the first experiment.

As shown in FIG. 11, when the target vehicle is located at a distance of 15 meters, the license plate target is smaller, while when the vehicle is located at a distance of 1 meter, as shown in FIG. 12, the license plate is blurred due to the fast speed. However, SSD neural network completes the work of license plate detection and location well in both cases. Experiment demonstrates that the binocular stereo vision system can achieve license plate detection in 100% in the 1-15 meters range. Therefore, in the following experiments, the speed measurement experiments are mainly carried out in this range. Next, the license plates in the frames captured by the left-view camera are matched respectively, the license plates in the corresponding frames of the left-view and right-view cameras are matched, and the matching points are extracted. FIG. 13 is a schematic diagram of the matching between the license plate region in the corresponding video frames of the left-view and right-view cameras. On the left is the left-view video frame, and on the right is the right-view video frame. After screening the matching points by the method in step 5, the vehicle speed and steering state are calculated every 3 frames as a time node, that is, 10 measurements per second. The speed measurement results are shown in the following Table 1.

TABLE 1

Speed measurement results of the straight line motion with a uniform speed experiment

| Time node | Speed by satellite speed meter (km) | Speed by the invention (km) | Error rate (%) |
|---|---|---|---|
| 0 | 30.7 | 30.7 | 0 |
| 2 | 30.2 | 30.3 | 0.33 |
| 4 | 29.7 | 30.1 | 1.35 |
| 6 | 29.3 | 29.5 | 0.68 |
| 8 | 29.9 | 29.3 | 2.01 |
| 10 | 30.4 | 29.7 | 2.30 |
| 12 | 30.3 | 29.9 | 1.32 |
| 14 | 30.4 | 30 | 1.32 |
| 16 | 30.1 | 29.8 | 1.00 |
| 18 | 29.8 | 29.9 | 0.34 |

Figure 14:
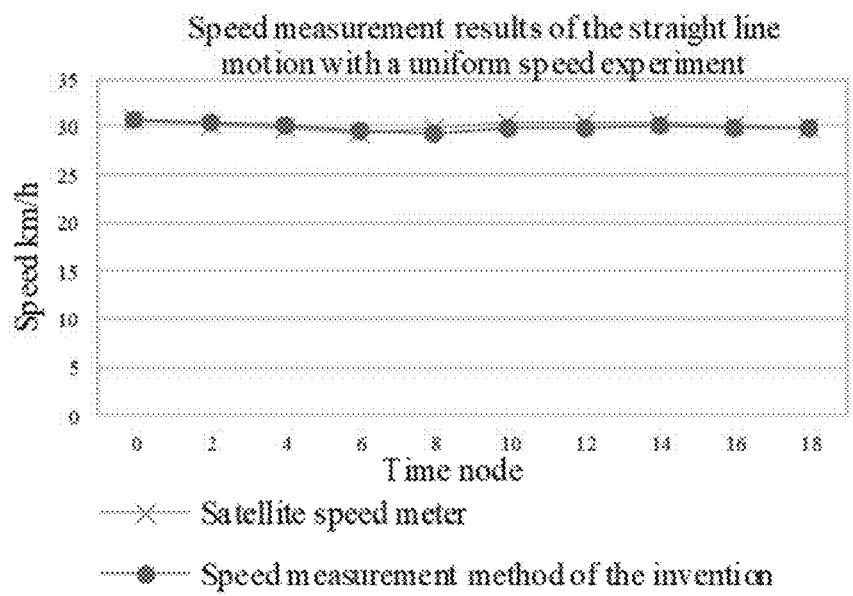
FIG. 14 is a comparison diagram of the speed measurement results in the experiment of straight line motion with a uniform speed.

In FIG. 14, the horizontal coordinate represents the detection time node, and the vertical coordinate represents the vehicle speed. The asterisk line represents the speed measured by the satellite speed meter, and the solid dot line represents the speed measured by the invention. Since the uniform speed cannot be strictly guaranteed in the vehicle's actual driving process, the speed data of the satellite speed meter is used as the truth ground for comparison. As shown in Table 1, in the case that the vehicle is driving at 30 km/h, the speed measured by the speed measurement method of the present invention is consistent with the speed measured by the satellite speed meter. The maximum error rate is only 2% (time node 8, the speed measured by the satellite speed meter is 29.9 km/h, and the speed measured by the present invention is 29.3 km/h).

Figure 15:
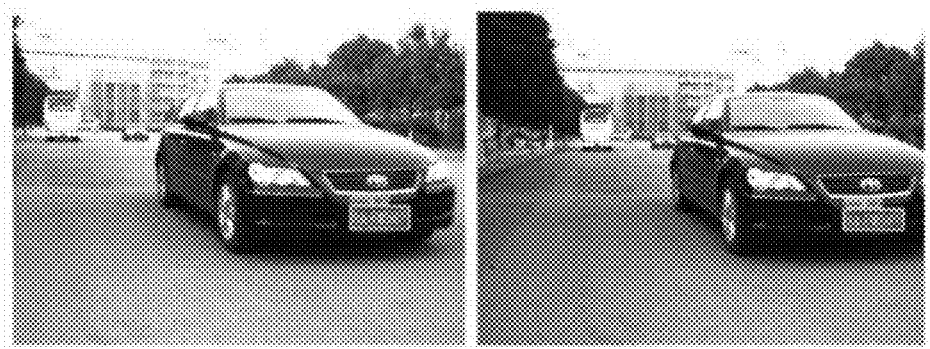
FIG. 15 is a screenshot of the captured video and the license plate detection result in the second experiment of straight line motion with changing speed, wherein (a) is a left-view video frame, and (b) is a right-view video frame.
Figure 16:
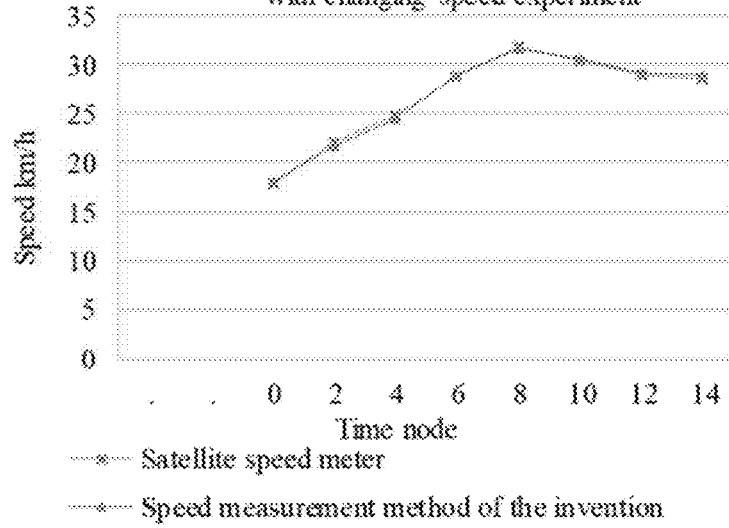
FIG. 16 is a comparison diagram of the speed measurement results in the experiment of straight line motion with changing speed.

Second Experiment:

Taking the vehicle speed meter as the reference, the vehicle is gradually accelerated to 30 km/h, and then is kept at a uniform speed. In this experiment, when the vehicle starts driving, the binocular stereo vision system is used for shooting until the vehicle leaves the shooting area. The binocular stereo vision system equipment is set up on the right side of the lane, keeping an angle of 20 degrees with the lane. After license plate detection, feature point extraction and matching, the vehicle speed is calculated. FIG. 15 is a screenshot of the captured video and the license plate detection result in the experiment of straight line motion with changing speed, wherein (a) is a left-view video frame, and (b) is a right-view video frame. The speed measurement results of the straight line motion with changing speed experiment are shown in FIG. 16 and Table 2.

TABLE 2

Speed measurement results of the straight line motion with changing speed experiment

| Time node | Speed by satellite speed meter (km) | Speed by the invention (km) | Error rate (%) |
|---|---|---|---|
| 0 | 17.8 | 18.1 | 1.69 |
| 2 | 22.1 | 21.6 | 2.26 |
| 4 | 24.9 | 24.5 | 1.61 |
| 6 | 28.9 | 29 | 0.35 |
| 8 | 31.9 | 31.7 | 0.63 |
| 10 | 30.4 | 30.7 | 0.99 |
| 12 | 29.1 | 29.2 | 0.34 |
| 14 | 28.7 | 29 | 1.05 |

In FIG. 16, the horizontal coordinate represents the detection time node, and the vertical coordinate represents the vehicle speed. The cross line represents the speed measured by the satellite speed meter, and the triangle line represents the speed measured by the invention. As shown in Table 2, in the process that the vehicle changes speed, the speed measured by the speed measurement method of the present invention can still obtain good results. The maximum error rate is 2.3% (time node 2, the speed measured by the satellite speed meter is 22.1 km/h, and the speed measured by the present invention is 21.6 km/h), with good measurement accuracy.

Figure 17:
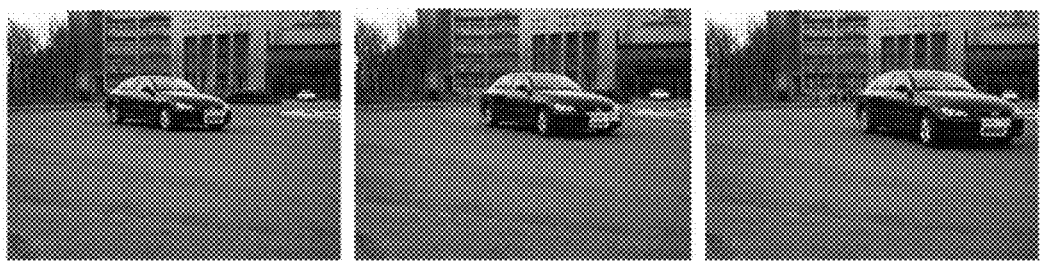
FIG. 17 is the corresponding screenshots of the left-view and right-view video frames (one frame for every three frames) and the license plate detection results in the third steering experiment, wherein (a1) is a left-view video frame 1, (a2) is a left-view video frame 2, (a3) is a left-view video frame 3, (b1) is a right-view video frame 1, (b2) is a right-view video frame 2, and (b3) is a right-view video frame 3.
Figure 17:
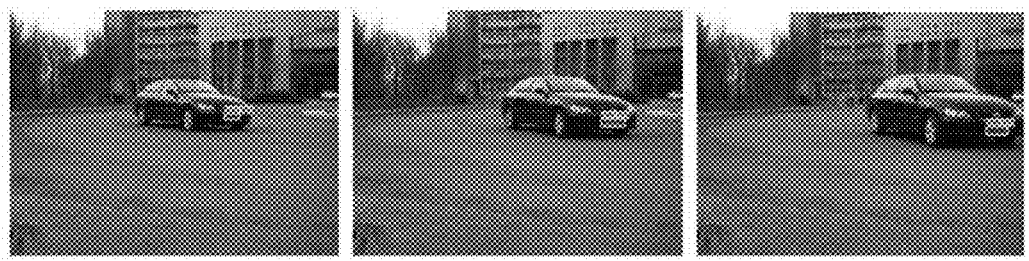

Third Experiment:

Taking the vehicle speed meter as the reference, the vehicle is gradually accelerated to 30 km/h from the stop state, and then is kept at a uniform speed. When the vehicle reaches the starting position (20 meters away from the binocular stereo vision system), the binocular stereo vision system starts shooting. At the same time, the vehicle drives around the roundabout counterclockwise, turns left from the start, keeps driving straightly, and then turns right. The binocular stereo vision system is used for shooting from start until the vehicle leaves the shooting area. The binocular stereo vision system equipment is set up on the right side of the lane at the south exit of the roundabout, facing the north-east direction, so as to cover the west section of the roundabout. The position and angle of the device remain unchanged during the shooting process. The screenshots and detection results of some shot images are shown in FIG. 17. As can be seen from FIG. 17, 1 frame is selected every 3 frames. After license plate detection, feature point extraction and matching, stereo measurement is performed on these points and the vehicle speed is calculated. The speed measurement results are shown in the following Table 3.

TABLE 3

Speed measurement results of steering experiment

| Time node | Speed by satellite speed meter (km) | Speed by the invention (km) | Error rate (%) |
|---|---|---|---|
| 0 | 29.2 | 29.7 | 1.71 |
| 2 | 29.2 | 29 | 0.68 |
| 4 | 29 | 28.1 | 3.10 |
| 6 | 28.4 | 28.7 | 1.06 |
| 8 | 29.2 | 29 | 0.68 |
| 10 | 30.4 | 29.6 | 2.63 |
| 12 | 30.7 | 30.1 | 1.95 |
| 14 | 30.1 | 30.5 | 1.33 |
| 16 | 29.4 | 30.1 | 2.38 |
| 18 | 29.8 | 30.3 | 1.68 |

Figure 18:
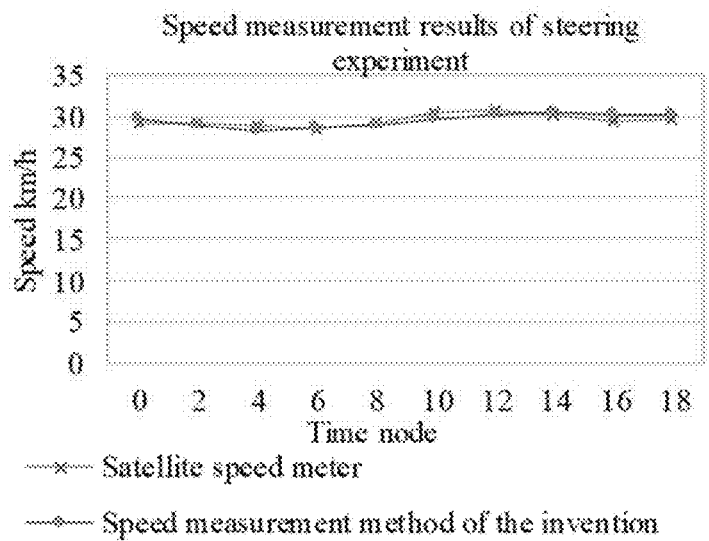
FIG. 18 is a comparison diagram of the speed measurement results in the third steering experiment.
Figure 19:
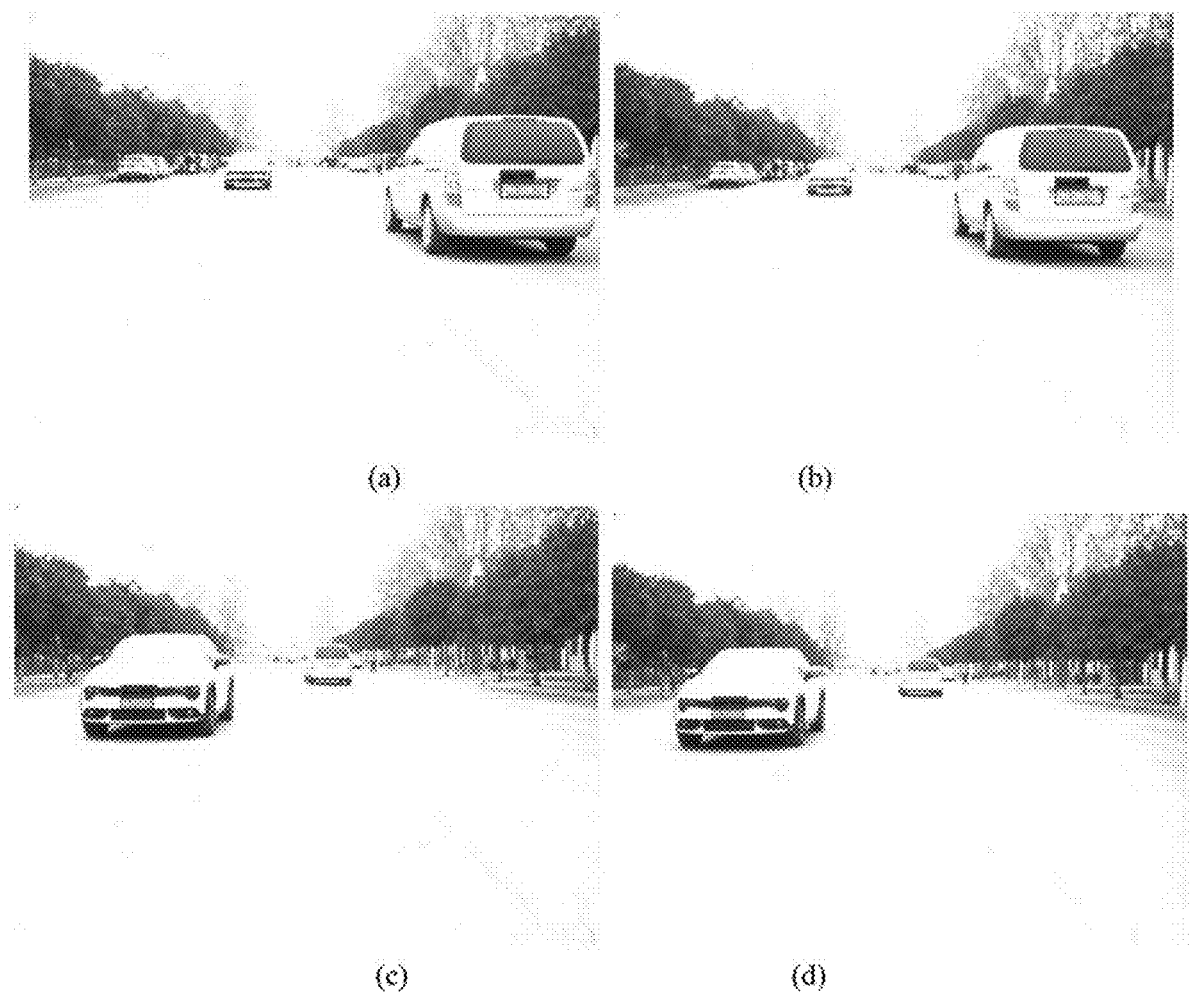
FIG. 19 is a screenshot of the captured video and the license plate detection result in the speed measurement experiment of two vehicles traveling in opposite directions, wherein (a) is a left-view video frame 1, and (b) is a right-view video frame 1; (c) is a left-view video frame 2, and (d) is a right-view video frame 2.

Table 3 and FIG. 18 show the speed measurement results. Due to the vehicle steering, the speed fluctuates. However, the speed measurement result of the invention is still consistent with that of the satellite speed meter. The maximum error occurs at the 10th time node. The speed measurement of the satellite is 30.4 km/h, and the speed measurement of the invention is 29.6 km/h, with an error rate of 2.6%.

Fourth Experiment:

The two vehicles are driving in opposite directions. The binocular stereo vision system equipment is set up in the middle of the two lanes. The left vehicle drives from far to near, and the right vehicle drives from near to far. Taking the vehicle speed meter as the reference, the two vehicles drive in a straight line motion at a maximum speed of 30 km/h respectively. A satellite speed meter is set up in each vehicle, whose results are used for comparison with the results of the invention. The speed measurement results of two vehicles traveling in opposite directions are shown in Table 4 and FIG. 20.

TABLE 4

Speed measurement results of two vehicles traveling in opposite directions

| | Left vehicle (approaching) | | | Right vehicle (away) | | |
|---|---|---|---|---|---|---|
| Time node | Speed by satellite speed meter (km) | Speed by the invention (km) | Error rate (%) | Speed by satellite speed meter (km) | Speed by the invention (km) | Error rate (%) |
| 0 | 19.7 | / | / | −18.7 | −19 | 1.60 |
| 2 | 20.2 | / | / | −22.3 | −21.5 | −3.59 |
| 4 | 20.6 | / | / | −25.3 | −24.7 | −2.37 |
| 6 | 21.2 | / | / | −28.8 | −28.2 | −2.08 |
| 8 | 21.7 | 20.9 | 3.69 | −31.2 | −31.5 | 0.96 |
| 10 | 24.2 | 23.6 | 2.48 | −29.9 | −30.6 | 2.34 |
| 12 | 27.9 | 27 | 3.22 | −29 | / | / |
| 14 | 30.7 | 30.1 | 1.95 | −28.3 | / | / |
| 16 | 31.6 | 32.2 | 1.90 | −27.8 | / | / |
| 18 | 30.2 | 31.2 | 3.31 | −27.2 | / | / |

Figure 20:
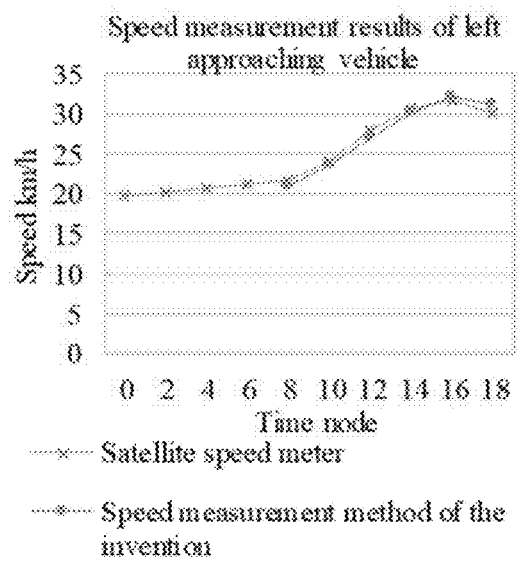
FIG. 20 is a comparison diagram of the speed measurement results in the two vehicles traveling in opposite directions experiment, wherein (a) is the speed measurement results of the left approaching vehicle, and (b) is the speed measurement results of the right departing vehicle.
Figure 20:
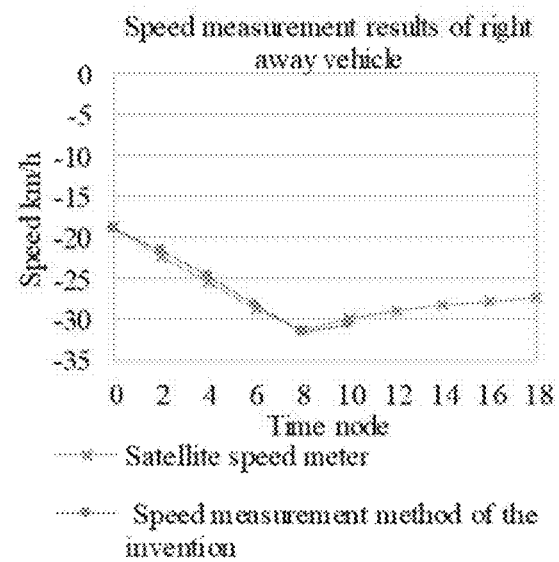

In FIG. 20, the horizontal coordinate represents the detection time node, and the vertical coordinate represents the vehicle speed. The asterisk line represents the speed measured by the satellite speed meter, and the solid dot line represents the speed measured by the invention. Each vehicle keeps driving at a speed about 30 km/h. A positive value indicates that the vehicle is approaching the binocular stereo vision system, while a negative value indicates that the vehicle is away from the binocular stereo vision system. Table 4 includes time nodes with unmeasured speed, which is because that the vehicle is far away and the camera cannot shoot a clear image of the license plate, resulting in an unrecognized license plate in the frame. However, when the vehicle drives into the area that can be shot clearly, the speed measurement works well and achieves good accuracy. The maximum error occurs at the eighth time node of the left vehicle speed measurement. The speed measurement of the satellite is 21.7 km/h, and the speed measurement of the invention is 20.9 km/h, with an error rate of 3.69%.

From the above four groups of experiments, it can be verified that the binocular stereo vision system has good stability and reliability in the actual vehicle speed measurement application. Compared with the traditional speed measurement method, the invention has the advantages of high intelligence, strong expandability, independency in completing the functions of video acquisition, vehicle identification, speed measurement, etc. without the assistance of other equipment. In addition, binocular stereo ranging technology belongs to passive ranging, that is, the system does not actively radiate any signal or ray, which is safer, with low energy consumption, no affectation to human health, and no interfere with other electronic equipment. There is no limitation on the placement angle, no need to be vertical or parallel to the moving direction of the target object, with higher stability, lower cost, easy installation and debugging. It can be used to upgrade the existing multi-lane traffic control system, so as to realize multiple functions of monitoring, ranging and speed measurement at the same time.

According to the national standard GB/T21255-2007 for motor vehicle speed meter, when the vehicle speed is less than 0-100 km/h, the speed measurement error should not exceed 6 mk/h, and when the vehicle speed is more than 100 km/h, the error should not exceed 6%. Experimental results of the invention show that the speed measurement error does not exceed 4% (i.e. 1.5 km/h), which meets the speed measurement accuracy requirements.

The descriptions above are only preferred embodiments of the present invention, but are not intended to limit the present invention. Any modifications, equivalent substitutions, improvement and the like made within the spirit and principles of the present invention are all intended to be concluded in the protection scope of the present invention.

What we claimed is:

1. A method for intelligently measuring vehicle speed based on a binocular stereo vision system, comprising:
    step 1, inputting a dataset of images containing license plates into an SSD (Single Shot Multibox Detector) neural network, and training the SSD neural network with license plate as a detection feature to obtain a license plate recognition model;
    step 2, installing the binocular stereo vision system on the right side, middle or above a lane, calibrating the binocular stereo vision system to acquire the internal and external parameters of two cameras; and recording videos of moving target vehicles by the calibrated binocular stereo vision system;
    step 3, detecting the license plates in video frames recorded by the calibrated binocular stereo vision system with the license plate recognition model trained in step 1, and locating license plate positions of the target vehicles;
    step 4, performing feature point extraction and stereo matching on the license plates in subsequent frames of the same camera by a feature-based matching algorithm, and reserving correct matching points after filtering with a homography matrix; performing feature point extraction and stereo matching on the license plates in corresponding left-view and right-view video frames of the binocular stereo vision system by the feature-based matching algorithm, and reserving correct matching points after filtering with the homography matrix;
    step 5, screening the reserved matching point pairs in step 4, then eliminating screened matching point pairs by a distance measurement method of the binocular stereo vision system, and reserving one closest to a license plate center as the position of a target vehicle in a current frame;
    step 6, performing stereo measurement on the screened matching point pairs by the binocular stereo vision system to get spatial position coordinates; calculating a distance that the target vehicle passes in a certain time according to the position information, and obtaining a moving speed of the target vehicle;
    the calibration method for the binocular stereo vision system in the step 2 comprises: calibrating the two cameras to acquire parameters of the two cameras respectively, which includes coordinates of optical center, focal length, scale factor and/or lens distortion; after acquiring the parameters of the two cameras, calibrating the binocular stereo vision system again to acquire the displacement and rotation angle of a right-view camera relative to a left-view camera (taking the left-view camera as a reference),
    a calibration method for the binocular stereo vision system comprises: taking the left-view camera as the reference, calibrating to acquire the external parameters (relative translation vector $T1=(l,m,n)^T$ and relative rotation vector $V=(\alpha,\beta,\gamma)^T)$) of the right-view camera and the internal parameters (focal length, optical-axis angle, and distortion) of the two cameras, wherein T refers to a transpose of a matrix, l,m,n refer to displacements of the right-view camera relative to the left-view camera in the three directions of x, y and z respectively, α,β,γ refer to rotation angles of the right-view camera relative to the left-view camera around the three axes of x, y and z respectively, a convergence point of the binocular stereo vision system is determined according to the external parameters:

$$\begin{cases} B = \sqrt{l^2 + m^2 + n^2} \\ \varepsilon = \beta \end{cases}$$

wherein, B is the baseline length between the two cameras, and ε indicates the angle between optical axes of the two cameras, a transformation model is established for a target angle, imaging points of identical spatial point in the two cameras are respectively called a left corresponding point and a right corresponding point, which are intersections of the optical axes of the left-view camera and the right-view camera and respective imaging planes of the two optical axes, a' represents the difference between the left corresponding point and a convergence point in the u direction of an image coordinate system, and b' represents the difference between the right corresponding point and the convergence point in the u direction of the image coordinate system, if the left corresponding point or the right corresponding point is on the left side of the convergence point, a difference value is less than 0, otherwise the difference value is greater than 0, the optical axes are perpendicular to respective imaging planes a line connecting an optical center to a target point is called a corresponding axis, angles a and b between corresponding axes and the optical axes are calculated as:

$$\begin{cases} a = \arctan(a'/f_l) \\ b = \arctan(b'/f_r) \end{cases}$$

wherein, $f_l$ and $f_r$ indicate the focal length of the left-view camera and the right-view camera respectively, for the target point in region I, a target angle c is calculated as $$\begin{cases} c = \varepsilon + |b| - |a| = \varepsilon - b + a; \\ a < 0, b < 0 \,\&\, \varepsilon > 0 \end{cases}$$

assuming world coordinates of a target point P in region I are (x, y, z), a depth calculation model for the target point P is established as:

$$\tan a = \frac{x}{z};$$

$$\tan(c - a) = \frac{l + x}{z - n}, a < 0$$

then $$z = \frac{n\tan(\varepsilon - b) + l}{\tan(\varepsilon - b) + \tan a}$$

a world coordinate x is calculated with a depth calculation model for the target point P as:

$$x = \frac{n\tan(\varepsilon - b) + l}{\tan(\varepsilon - b) + \tan a} \tan a.$$

a world coordinate y are calculated according to a relation between a left corresponding point and a right corresponding point in the image coordinate system and a relation between the image coordinate system and the world coordinate system
the world coordinates of the target point P are:

$$\begin{cases} x = \frac{n\tan(\varepsilon - b) + l}{\tan(\varepsilon - b) + \tan a} \tan a \\ y = \frac{n\tan(\varepsilon - b) + l}{\tan(\varepsilon - b) + \tan a} \cdot \frac{v'}{f_l} \\ z = \frac{n\tan(\varepsilon - b) + l}{\tan(\varepsilon - b) + \tan a} \end{cases};$$

wherein, v' indicates pixel difference between the target point P and an image center in the longitudinal direction of the image coordinate system, and $f_l$ is the focal length of the left-view camera, then world coordinates of the target point P in region II, region III and region IV are calculated.

2. The method for intelligently measuring vehicle speed based on the binocular stereo vision system according to claim 1, wherein the SSD neural network in step 1 is formed on the basis of a classical SSD neural network by removing the convolutional layer conv11_2 and reserving convolutional layers conv4_3, conv_7, conv8_2, conv9_2 and conv10_2, a feature information in different scales extracted by the convolutional layers is fused and input into a classifier, a position of the license plate is predicted by the license plate recognition model according to feature maps output by the classifier.

3. The method for intelligently measuring vehicle speed based on the binocular stereo vision system according to claim 2, wherein the dataset in step 1 is composed of a BIT-Vehicle dataset provided by Beijing Institute of Technology, an open license plate dataset provided by OpenITS research plan sponsored by Guangdong Key Laboratory of Intelligent Transportation Systems (ITS), and 1000 self-shot license plate images, 11,000 images in total.

4. The method for intelligently measuring vehicle speed based on the binocular stereo vision system according to claim 1, wherein the dataset in step 1 is composed of BIT-Vehicle dataset provided by Beijing Institute of Technology, an open license plate dataset provided by OpenITS research plan sponsored by Guangdong Key Laboratory of Intelligent Transportation Systems (ITS), and 1000 self-shot license plate images, 11,000 images in total.

5. The method for intelligently measuring vehicle speed based on the binocular stereo vision system according to claim 1, wherein the binocular stereo vision system comprises a host computer, wherein the two cameras are flea2 industrial cameras, one for the left-view camera and the other for the right-view camera, and both are connected with the host computer.

6. The method for intelligently measuring vehicle speed based on the binocular stereo vision system according to claim 1, wherein the feature-based matching algorithm is a SURF feature extracting and matching algorithm, local features of the video frames are described by SURF descriptors, the homography matrix describes a relationship between two images of the same object taken in different views, assuming that a relationship of the two images is perspective transformation, then a homography matrix H is:

$$H = \begin{bmatrix} h_{11} & h_{12} & h_{13} \\ h_{21} & h_{22} & h_{23} \\ h_{31} & h_{32} & 1 \end{bmatrix};$$

then $$\begin{bmatrix} x' \\ y' \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix}$$

wherein x', y', 1 and x, y, 1 represent the coordinates of the two corresponding points before and after the perspective transformation respectively, and $h_{11\text{-}32}$ are transformation parameters to be calculate,
to calculate the eight transformation parameters $h_{11\text{-}32}$ in the homography matrix H, at least four pairs of matching points are needed, a process with four pairs of matching points is as follows:

$$\begin{bmatrix} x_1, y_1, 1, 0, 0, 0, -x'_1x_1, -x'_1y_1 \\ 0, 0, 0, x_1, y_1, 1, -y'_1x_1, -y'_1y_1 \\ x_2, y_2, 1, 0, 0, 0, -x'_2x_2, -x'_2y_2 \\ 0, 0, 0, x_2, y_2, 1, -y'_2x_2, -y'_2y_2 \\ x_3, y_3, 1, 0, 0, 0, -x'_3x_3, -x'_3y_3 \\ 0, 0, 0, x_3, y_3, 1, -y'_3x_3, -y'_3y_3 \\ x_4, y_4, 1, 0, 0, 0, -x'_4x_4, -x'_4y_4 \\ 0, 0, 0, x_4, y_4, 1, -y'_4x_4, -y'_4y_4 \end{bmatrix} \begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} x'_1 \\ y'_1 \\ x'_2 \\ y'_2 \\ x'_3 \\ y'_3 \\ x'_4 \\ y'_4 \end{bmatrix};$$

each time, four pairs of matching points are selected from all the matching points to calculate the homography matrix H, where coordinates of the two corresponding points before and after the perspective transformation of the four pairs of matching points are $x'_1$, $y'_1$, 1 and $x_1$, $y_1$, 1; $x'_2$, $y'_2$, 1 and $x_2$, $y_2$, 1; $x'_3$, $y'_3$, 1 and $x_3$, $y_3$, 1; are $x'_4$, $y'_4$, 1 and $x_4$, $y_4$, 1; and; then the homography matrix H with the maximum number of accurate matching points is selected as a correct result, in order to check an accuracy of the matrix H, the Euclidean distance between the corresponding matching points after the perspective transformation is calculated:

$$\left\| \begin{bmatrix} x'_{i1} \\ y'_{i1} \\ 1 \end{bmatrix} - H \begin{bmatrix} x_{i1} \\ y_{i1} \\ 1 \end{bmatrix} \right\| \leq t$$

wherein $x'_{i1}$, $y'_{i1}$, 1 and $x_{i1}$, $y_{i1}$, 1 are the coordinates of the matching points before and after the perspective transformation, t is the Euclidean distance threshold, and i1=1,2,3,4, the smaller the Euclidean distance, the higher a matching accuracy of two matching points.

7. The method for intelligently measuring vehicle speed based on the binocular stereo vision system according to claim 6, wherein the screening in step 5 comprises: in a left-view video frame, drawing a circle in a license plate area by taking the center point of the area as the circle center and the height of the area as the diameter; in a corresponding right-view video frame, drawing an isometric circle by taking the center of a matching area as the circle center; and eliminating the matching points not simultaneously contained in the two circles.

8. The method for intelligently measuring vehicle speed based on the binocular stereo vision system according to claim 7, wherein in step 6, stereo measurement is performed on screened matching points by the binocular stereo vision system to get the positions $P_1=(x_1, y_1, z_1)$ and $P_2=(x_2, y_2, z_2)$ of the target vehicle at the time $t_1$ and $t_2$, the time interval is $\Delta t = t_1 - t_2$, the average speed of the target vehicle between points $P_1$ and $P_2$ is calculated as:

$$s = \frac{\sqrt{(x_2 - x_1)^2 + (y_2 - y_1)^2 + (z_2 - z_1)^2}}{\Delta t}.$$

9. The method for intelligently measuring vehicle speed based on the binocular stereo vision system according to claim 6, wherein the distance measurement method of the binocular stereo vision system in step 5 comprises: calculating the distance $d_i$ of all N matching points respectively; calculating the mean value $\mu$ and the standard deviation $\sigma$ of $d_i$; calculating the Z score $Z_i$ for each matching point:

$$\mu = \frac{\sum_{i=1}^{N} d_i}{N}$$

$$\sigma = \sqrt{\frac{1}{N} \sum_{i=1}^{N} (d_i - \mu)^2}$$

$$Z_i = \frac{(d_i - \mu)}{\sigma}$$

eliminating m1 matching points with the absolute values of Z score $|Z_i|>1$; choosing the matching point i closest to the center of the license plate from the remaining N−m1 matching points; and taking coordinates of the matching point i as the position $P_i$ of the target vehicle in current frame.

10. The method for intelligently measuring vehicle speed based on the binocular stereo vision system according to claim 1, wherein the screening in step 5 comprises: in a left-view video frame, drawing a circle in a license plate area by taking the center point of the area as the circle center and the height of the area as the diameter; in a corresponding right-view video frame, drawing an isometric circle by taking the center of a matching area as the circle center; and eliminating the matching points not simultaneously contained in the two circles.

11. The method for intelligently measuring vehicle speed based on the binocular stereo vision system according to claim 10, wherein in step 6, stereo measurement is performed on screened matching points by the binocular stereo vision system to get the positions $P_1=(x_1, y_1, z_1)$ and $P_2=(x_2, y_2, z_2)$ of the target vehicle at the time $t_1$ and $t_2$; the time interval is $\Delta t = t_1 - t_2$; the average speed of the target vehicle between points $P_1$ and $P_2$ is calculated as:

$$s = \frac{\sqrt{(x_2 - x_1)^2 + (y_2 - y_1)^2 + (z_2 - z_1)^2}}{\Delta t}.$$

12. The method for intelligently measuring vehicle speed based on the binocular stereo vision system according to claim 1, wherein the distance measurement method of the binocular stereo vision system in step 5 comprises: calculating the distance $d_i$ of all N matching points respectively; calculating the mean value $\mu$ and the standard deviation $\sigma$ of $d_i$; calculating the Z score $Z_i$ for each matching point:

$$\mu = \frac{\sum_{i=1}^{N} d_i}{N}$$

$$\sigma = \sqrt{\frac{1}{N}\sum_{i=1}^{N}(d_i - \mu)^2}$$

$$Z_i = \frac{(d_i - \mu)}{\sigma}$$

eliminating m1 matching points with the absolute values of Z score $|Z_i|>1$; choosing the matching point i closest to the center of the license plate from the remaining N−m1 matching points; and taking coordinates of the matching point i as the position of $P_i$ the target vehicle in the current frame.

\* \* \* \* \*